(12) United States Patent
Levy et al.

(10) Patent No.: US 8,141,854 B2
(45) Date of Patent: Mar. 27, 2012

(54) GAS SPRING ASSEMBLY AND METHOD

(75) Inventors: Daniel I Levy, High Beech (GB); Jonathan Hall, Slough (GB)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 1000 days.

(21) Appl. No.: 12/055,849

(22) Filed: Mar. 26, 2008

(65) Prior Publication Data

US 2008/0246198 A1    Oct. 9, 2008

Related U.S. Application Data

(60) Provisional application No. 60/922,452, filed on Apr. 9, 2007.

(51) Int. Cl.
*F16F 9/04* (2006.01)

(52) U.S. Cl. .................. 267/64.27; 267/64.24

(58) Field of Classification Search .............. 267/64.11, 267/64.12, 64.13, 64.14, 64.15, 64.16, 64.17, 267/64.18, 64.19, 64.21, 64.22, 64.23, 64.24, 267/64.25, 64.26, 64.27, 64.28
See application file for complete search history.

(56) References Cited

U.S. PATENT DOCUMENTS

| | | | | |
|---|---|---|---|---|
| 3,596,895 A | * | 8/1971 | Hirtreiter | 267/64.24 |
| 3,954,257 A | * | 5/1976 | Keijzer et al. | 267/64.21 |
| 4,564,177 A | * | 1/1986 | Leonard | 267/64.24 |
| 5,382,006 A | | 1/1995 | Arnold | |
| 6,386,524 B1 | | 5/2002 | Levy et al. | |
| 6,439,550 B1 | * | 8/2002 | Koch | 267/64.23 |
| 7,497,423 B2 | * | 3/2009 | Myers | 267/64.27 |
| 2002/0011697 A1 | * | 1/2002 | Pesch et al. | 267/64.23 |
| 2006/0181145 A1 | * | 8/2006 | Stuani | 303/123 |

FOREIGN PATENT DOCUMENTS

| | | |
|---|---|---|
| DE | 18 32 310 U | 5/1961 |
| DE | 12 85 792 B | 12/1968 |
| DE | 31 47 231 C1 | 3/1983 |
| DE | 41 15 028 A1 | 11/1992 |
| DE | 199 07 656 A1 | 8/2000 |
| DE | 100 57 921 A1 | 6/2001 |
| DE | 10 2004 030335 A1 | 1/2006 |
| EP | 0 859 165 A | 8/1998 |
| GB | 852 275 A | 10/1960 |
| GB | 1 001 515 A | 8/1965 |
| GB | 1 074 626 A | 7/1967 |
| WO | WO 00/70238 A | 11/2000 |

OTHER PUBLICATIONS

"Glass-Mat-Reinforced Thermoplastic Offiers New Scope for Vehicle Suspension" Design Engineering, Morgan-Grampian Ltd. ,London, GB, Mar. 1, 1989, pp. 22.

* cited by examiner

*Primary Examiner* — Bradley King
*Assistant Examiner* — Nicholas J Lane
(74) *Attorney, Agent, or Firm* — Jason A. Houser; Fay Sharpe LLP

(57) ABSTRACT

A gas spring assembly includes a first end member, a piston assembly and a flexible wall extending therebetween. The piston assembly includes a piston body receiving a portion of the flexible wall and a retainment ring for retaining the flexible wall on the piston body. A method of assembly is also included.

15 Claims, 4 Drawing Sheets

GAS SPRING ASSEMBLY AND METHOD

This application claims priority from U.S. Provisional Application Ser. No. 60/922,452 filed on Apr. 9, 2007, which is hereby incorporated herein by reference in its entirety.

BACKGROUND

The subject matter of the present disclosure broadly relates to the art of vehicle suspension systems and, more particularly, to a gas spring assembly that includes a two-piece piston assembly capable of retaining a flexible wall thereon while the gas spring assembly is undergoing a tension load. The subject matter of the present disclosure also relates to a method of assembling such a gas spring assembly.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In many applications and uses associated with wheeled motor vehicles, the suspension system of the vehicle is adapted and arranged such that there are substantially no operating conditions, during normal usage, under which the plurality of spring devices would be tensioned or otherwise undergo a tension load. That is, the configuration and/or use of conventional suspension systems is such that the spring devices are used in compression under essentially all operating conditions. In such operating environments, it is possible to utilize a gas spring assembly that has a simplified construction and minimal retention (in the direction opposite that associated with normal use) of the flexible wall thereof on the piston of the gas spring assembly. As a more-specific example, a construction can be used in which an open end of the flexible wall thereof is "snapped-on" or otherwise press-fit onto the piston of the gas spring assembly. It will be appreciated that such "snap-on" constructions can result in lower cost gas spring assemblies, at least in part, because a reduced number of components can be used and also because simplified assembly and other manufacturing techniques can be employed.

This "snap-on" interengagement between the open end of the flexible wall and a portion of the piston normally provides sufficient retention for handling and installation purposes. It will be recognized, however, that such constructions are poorly suited for applications in which the gas spring assembly will be stretched or otherwise placed in tension, as this could generate an undesirable separation between the flexible wall and the piston of the gas spring assembly.

Another example of a known construction that utilizes a simplified connection between the flexible wall and the piston of the gas spring assembly includes a clip ring that is removably secured on the piston. The open end of the flexible wall is press-fitted onto the mounting area of the piston. The clip ring is then snapped or otherwise removably secured on the end of the piston adjacent the mounting area with a portion of the clip ring contacting the flexible wall to maintain the same in position, such as during handling and installation. Typically, however, known clip rings are not suitable for providing sufficient support to withstand a tension load being applied to the gas spring assembly without an undesirable separation between the flexible wall and the piston. Accordingly, such constructions are not known or believed to be used in applications in which tension loads occur.

It is desirable to develop a simplified gas spring construction that overcomes the foregoing problems and difficulties while maintaining a relatively low cost of manufacture and ease of assembly.

BRIEF DESCRIPTION

One exemplary embodiment of a gas spring assembly in accordance with the present novel concept is provided that includes a first end member and a flexible wall. The flexible wall includes first and second open ends with the first open end secured on the first end member. A piston assembly is spaced from the first end member and includes a piston body and a retainment ring. The piston body includes a flexible wall-receiving portion that is adapted to receive and form a substantially fluid-tight seal with the second open end of the flexible wall. The retainment ring includes a radially-outwardly extending flange wall and is secured along the flexible wall-receiving portion such that the flange wall projects radially-outwardly beyond at least a portion of the flexible wall-receiving portion of the piston body for retainment of the second open end thereon.

Another exemplary embodiment of a gas spring assembly in accordance with the present novel concept is provided that is adapted for securement between spaced first and second associated structural components of an associated vehicle. The gas spring assembly includes a first end member that is adapted for securement along the first associated structural component of the associated vehicle. A piston assembly is spaced from the first end member such that a longitudinally-extending central axis is disposed therebetween. A flexible wall is disposed about the axis and is secured between the first end member and the piston assembly. The flexible wall includes a first open end and an opposing second open end. The piston assembly includes a piston body and a retainment ring. The piston body includes a first end disposed toward the first end member and a second end disposed away from the first end member with an outer side wall extending at least partially therebetween. The second end includes a base wall adapted for securement along the second associated structural component. The first end includes a first lateral wall portion that extends approximately transverse to the axis and an annular wall portion that extends axially from the first lateral wall portion generally away from the second end. The second open end of the flexible wall has a cross-sectional wall thickness, and the second open end is received on the annular wall portion such that a substantially fluid-tight seal is formed between the second open end and the annular wall portion. The retainment ring includes an axially extending annular side wall and a flange wall extending radially-outwardly from the side wall. The retainment ring is received on the first end of the piston body such that a distance between the flange wall and the first lateral wall portion is greater than the cross-sectional wall thickness and a gap is thereby formed between the flexible wall and at least one of the flange wall and the first lateral wall portion.

DETAILED DESCRIPTION

Figure 1:
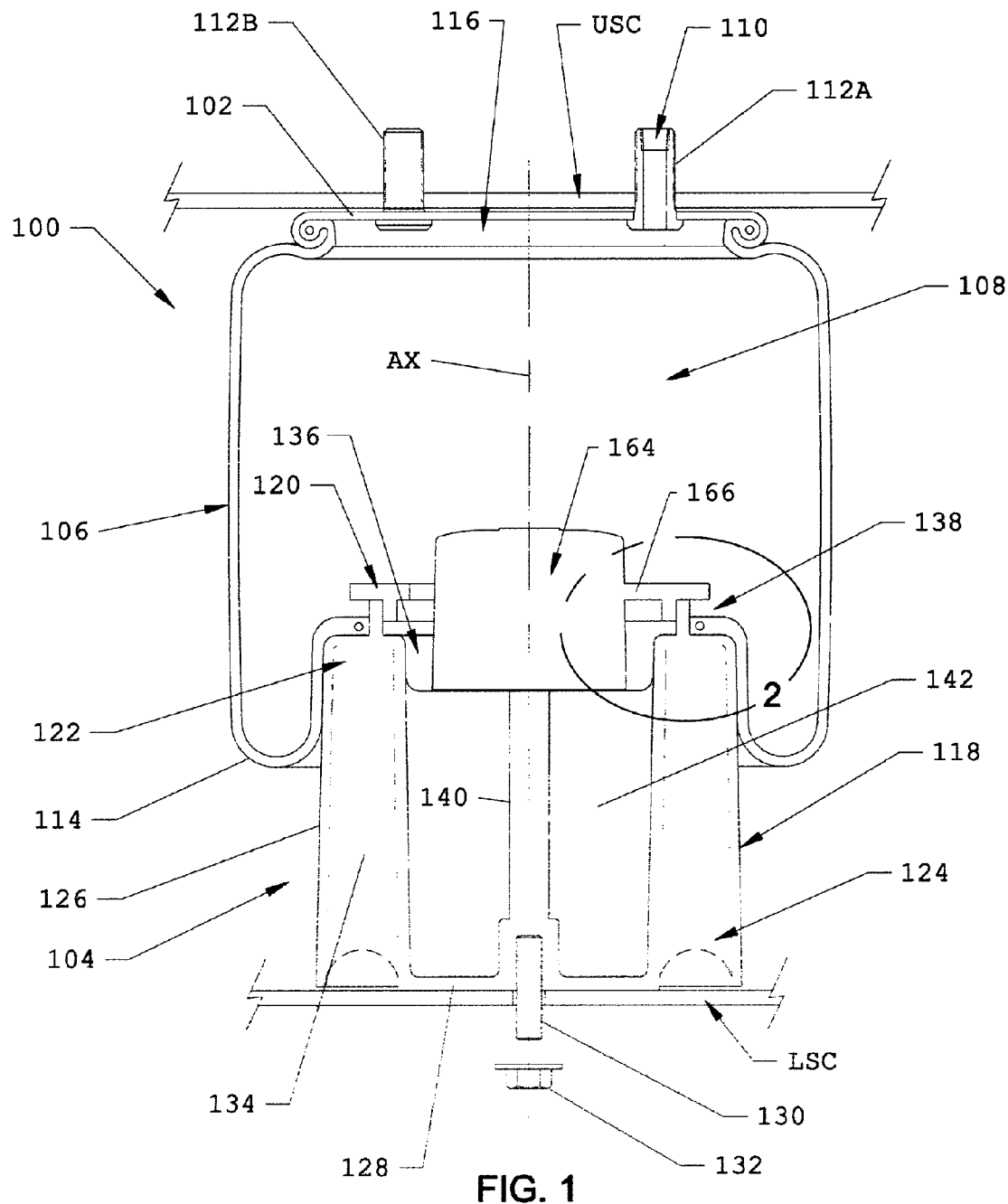
FIG. 1 is a side view, in partial cross-section, of one exemplary embodiment of a gas spring assembly in accordance with the subject matter of the present disclosure.

Turning now to the drawings wherein the showings are for the purpose of illustrating exemplary embodiments of the subject matter of the present disclosure and not for the purpose of limiting the same, FIG. 1 illustrates a gas spring assembly 100 that includes a first or upper end member 102 and a piston assembly 104 spaced from the first end member. A flexible wall 106 is secured between the first end member and the piston assembly and at least partially defines a spring chamber 108 therebetween. Preferably, the gas spring assembly contains a quantity of pressurized gas that can be transferred into and out of spring chamber 108 in any suitable manner, such as, for example, through a suitable gas transmission line (not shown) connected to a passage 110 extending through a mounting stud 112A. Additionally, the gas spring assembly can be installed or otherwise used in any suitable application or environment, such as use in a vehicle suspension system or an industrial mounting application, for example. Accordingly, as shown in FIG. 1, gas spring assembly 100 is supported between upper and lower structural components USC and LSC, and can be connected thereto in any suitable manner, such as by using mounting studs 112A and 112B, for example, which are shown extending through upper structural component USC.

Gas spring assembly 100 also includes an approximately centrally-disposed axis AX extending longitudinally between the first end member and the piston assembly such that flexible wall 106 is disposed approximately circumferentially about the axis and extends longitudinally therealong between the end member and the piston assembly. Gas spring assembly 100 is shown in FIG. 1 as having a somewhat cylindrically shaped flexible wall 106 that forms a rolling lobe 114 along piston assembly 104. A first or upper open end 116 of the flexible wall can be secured on first end member 102 in any suitable manner, such as by using a roll-crimped connection as shown in FIG. 1, for example.

Piston assembly 104 includes a piston body 118 and a retainment ring 120. Piston body 118 extends between a first or upper end 122 and an opposing, second or lower end 124. An outer side wall 126 extends between the first and second ends of the piston body, and a bottom or base wall 128 is disposed along second end 124 that is suitable for engaging lower structural component LSC. The piston assembly can be secured on the lower structural component in any suitable manner, such as by using a lower mounting stud 130 and threaded nut 132, for example. In the exemplary embodiment shown, the lower mounting stud is integrally formed into the piston body. However, it will be appreciated that such a construction is optional.

Piston body 118 can be formed in any suitable manner and from any suitable material or combination of materials. In one preferred embodiment, piston body 118 formed from a polymeric material as a single, unitary part. It will be appreciated that such a piston body can be formed in any suitable manner and using any suitable process or combination of processes, such as casting or molding, for example. As such, piston body 118 can optionally include any suitable cored areas or cavities 134, such as may be beneficial for manufacturing or other purposes. One additional benefit is that such additional volumes can, in some designs, be in communication with spring chamber 108 and, as such, can positively influence the performance of the gas spring assembly.

First or upper end 122 of piston body 118 includes a central recess portion 136 and a flexible wall-receiving portion 138 that is disposed generally outwardly from the central recess portion. The central recess portion can include any suitable features and/or structural components that may be desirable for the size, shape, application and/or use of the gas spring assembly. For example, central recess portion 136 can include a central column 140 and a plurality of webs or walls 142 that extend radially-outwardly from the central column. It will be appreciated, however, that any other suitable arrangement and/or configuration could alternately be used.

Figure 2:
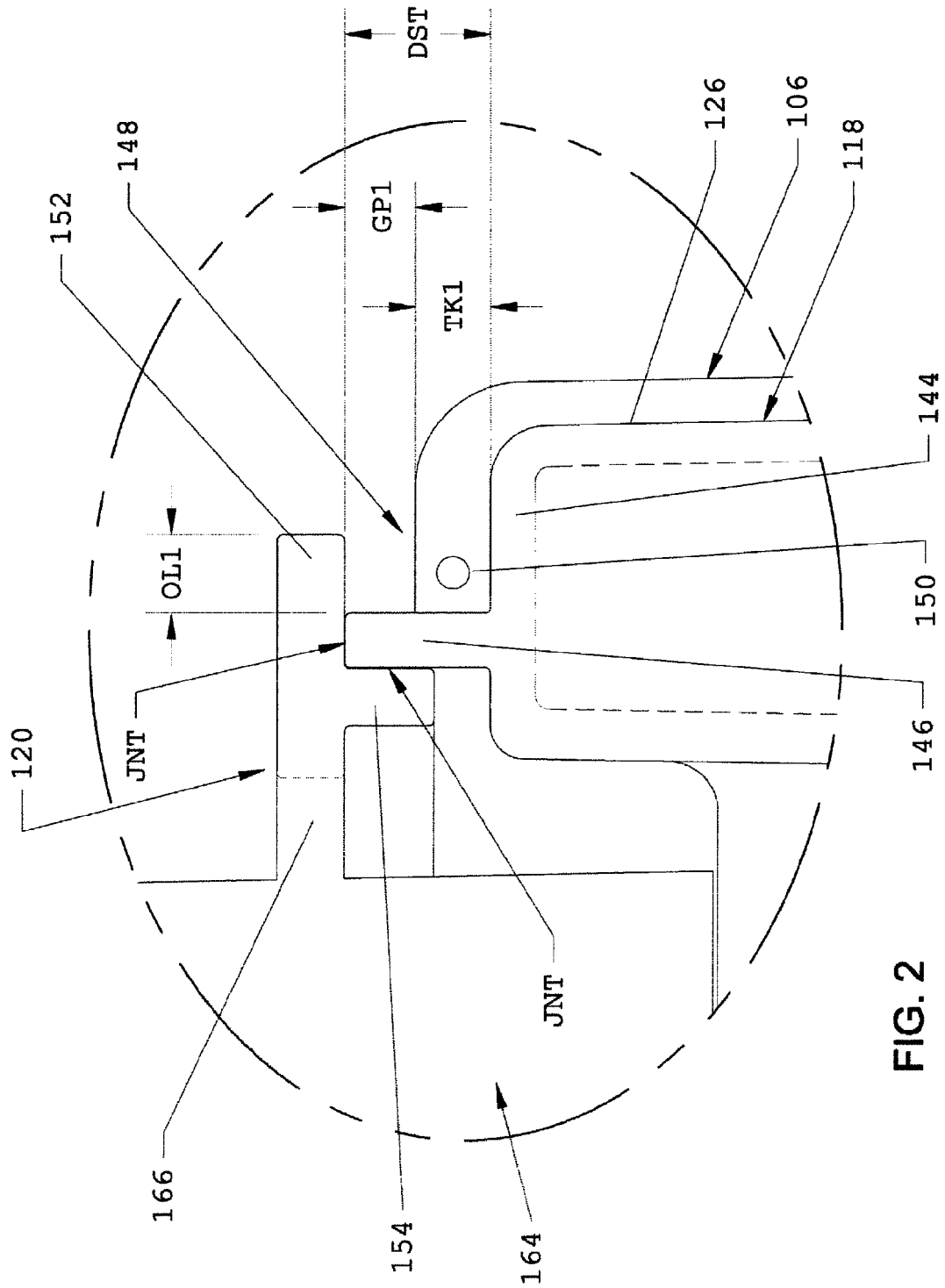
FIG. 2 is an enlarged cross-sectional view of Detail 2 in FIG. 1.

As can be more clearly seen in FIG. 2, flexible wall-receiving portion 138 of piston body 118 includes a radially or laterally-extending wall portion 144 disposed along an upper end of outer side wall 126. An axially-extending annular wall portion 146 extends from lateral wall portion 144 and is suitable for receiving a second open end 148 of flexible wall 106 thereon. Preferably, wall portion 146 and second open end 148 are cooperably dimensioned such that a substantially fluid-tight seal is formed therebetween. It will be appreciated that second open end 148 of flexible wall 106 can be of any suitable shape and/or configuration. In the exemplary embodiment shown, second open end 148 includes a cable or bead wire 150 formed thereinto and also has a maximum cross-sectional wall thickness, as represented by dimension TK1.

Retainment ring 120 is secured along flexible wall-receiving portion 138 and is adapted to retain second open end 148 of flexible wall 106 thereon when the gas spring assembly is subjected to tension load conditions. As such, retainment ring 120 can take any shape, form and/or configuration suitable for retaining the second open end in such a manner. In the exemplary embodiment shown in FIGS. 1 and 2, retainment ring 120 includes a radially or laterally-extending flange or wall 152 that projects radially outwardly beyond wall portion 146 of piston body 118 and at least a portion of the flexible wall forming second open end 148, as is represented by dimension OL1 in FIG. 2. In one preferred embodiment, radially-extending flange 152 extends outwardly beyond at least a portion of bead wire 150.

As will be discussed in greater detail hereinafter, retainment ring 120 can be secured on or along piston body 118 in any suitable manner. In one exemplary embodiment, retainment ring 120 is positioned relative to laterally-extending wall portion 144 such that a desired distance is maintained therebetween, as indicated by dimension DST in FIG. 2. In this exemplary embodiment, it is desirably to maintain a space or gap with the second open end of the flexible wall, as represented by dimension GP1, such that the portion of the flexible wall that forms the second open end is, at most, in contact with one of laterally-extending wall portion 144 and laterally-extending flange 152. Thus, the second open end could potentially be displaced along annular wall portion 146 as contact moves from one of wall portion 144 and flange 152 to the other thereof. It will be appreciated that the space or gap will generally be of a relatively small distance amount, and that the space or gap is shown as being greatly exaggerated for purposes of clarity and ease of understanding. However, it will be recognized that a space or gap of any distance that is suitable for securement of the retainment ring on the piston body can be used. One exemplary range for such a gap is from about 0.5 mm to about 5 mm.

Retainment ring 120 can be secured on piston body 118 in any suitable manner, such as by using either a non-removable connection or a removable attachment. In the embodiment shown in and discussed with regard to FIGS. 1 and 2, retainment ring 120 is non-removably secured on piston body 118. As one exemplary arrangement, retainment ring 120 includes an annular wall 154 that extends from laterally-extending flange 152. Preferably, annular wall 154 is cooperatively dimensioned with annular wall portion 146 such that a suitable friction welding operation can be used to permanently or otherwise non-removably secure the retainment ring on the piston body. As such, frictional weld joints could be provided in one or more of the areas indicated by reference characters JNT. It will be appreciated that any suitable frictional welding operation could be used, such as spin welding or ultrasonic welding, for example. Alternately, any other process or combination of processes that is or are suitable for permanently affixing the retainment ring on the piston body could be used, such as using a suitable adhesive, for example.

Figure 3:
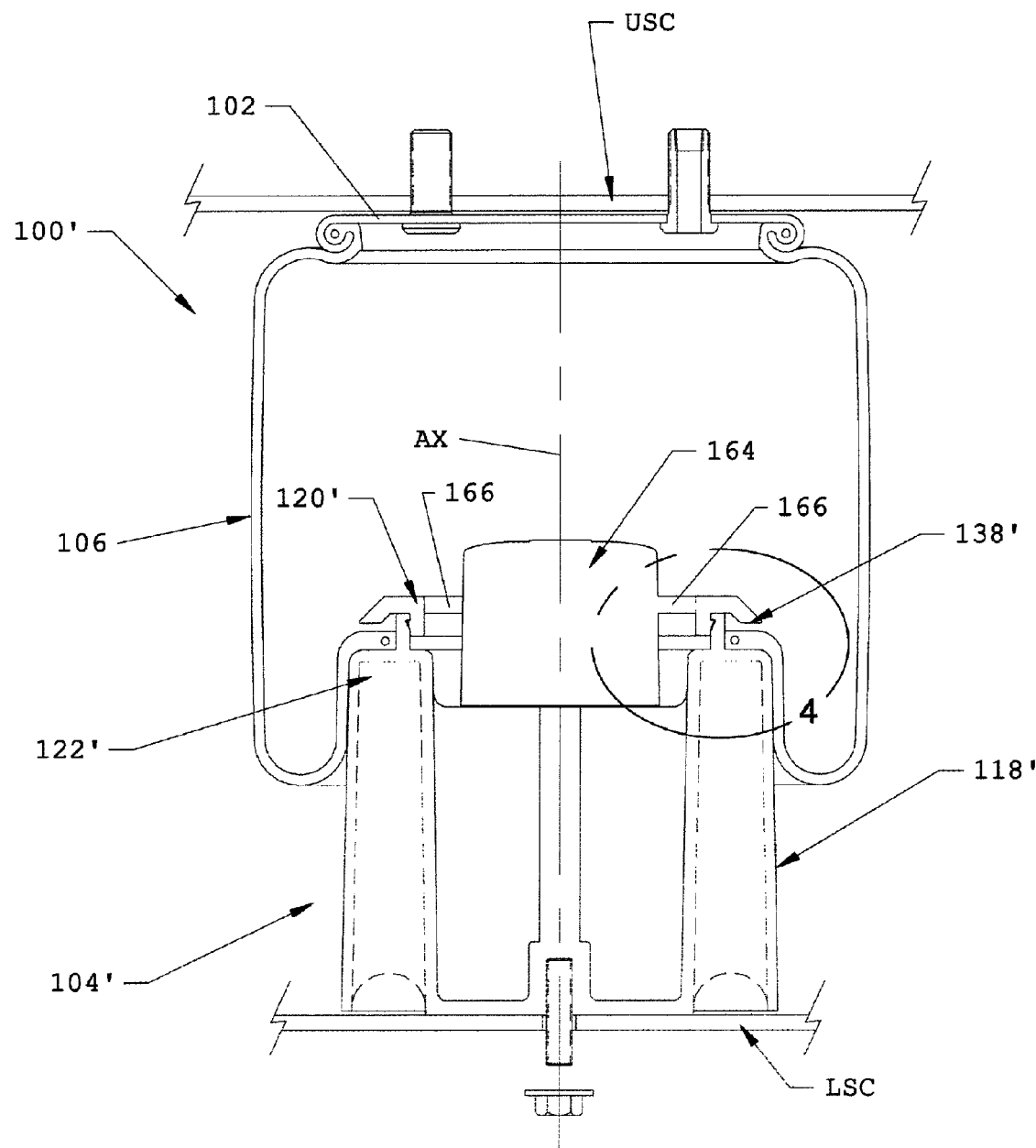
FIG. 3 is a side view, in partial cross-section, of another exemplary embodiment of a gas spring assembly in accordance with the subject matter of the present disclosure.
Figure 4:
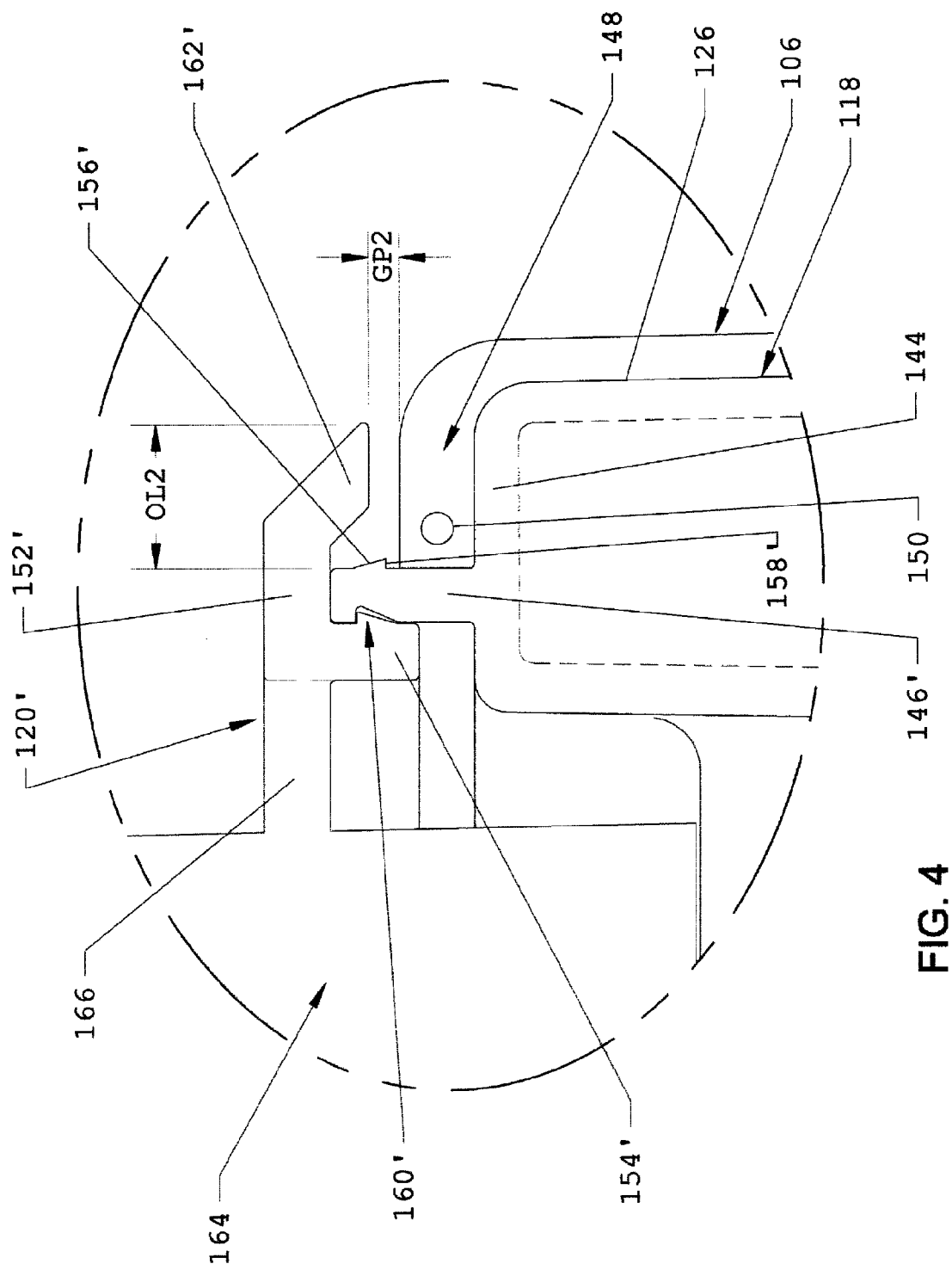
FIG. 4 is an enlarged cross-sectional view of Detail 4 in FIG. 3.

FIGS. 3 and 4 illustrate an alternate embodiment of a gas spring assembly 100' that includes a piston assembly 104' having a piston body 118' and retainment ring 120' that are removably secured together. It will be appreciated that gas spring assemblies 100 and 100' are otherwise substantially similar and that like elements, structure, features and/or components will be identified by like item numbers. New or different elements, structure, features and/or components will be identified using primed (') item numbers.

First or upper end 122' of piston body 118' includes a flexible wall-receiving portion 138' that has an axially-extending annular wall 146' with one or more features for removably securing retainment ring 120' thereon. Annular wall 146' extends from radially-extending wall portion 144 and second open end 148 of flexible wall 106 is received on annular wall 146' such that a substantially fluid-tight seal is formed with the second open end, such as has been discussed above, for example. In one exemplary embodiment, the second open end can be press-fitted or otherwise axially-displaced onto or otherwise along annular wall 146' such that one surface of the second open end is in abutting engagement with radially-extending wall portion 144. In either of the two exemplary embodiments disclosed herein, annular wall 146 (FIGS. 1 and 2) or 146' (FIGS. 3 and 4) can optionally include one or more "snap-on" projections that extend radially outwardly from along an outer surface of the annular wall. As shown in FIG. 4, such one or more projections 156' preferably include a projection end wall 158' that is disposed toward and in approximate alignment with radially-extending wall portion 144. These one or more projections can be used to prevent separation of the second open end of the flexible wall from the piston body during assembly and handling of the gas spring assembly.

A first engagement feature is shown in FIGS. 3 and 4 as being provided on annular wall 146'. Additionally, retainment ring 120' is shown as including a corresponding second engagement feature that interengages the first engagement feature to releaseably secure the retainment ring on piston body 118'. The first and second engagement features are generally indicated by item number 160'. In one preferred embodiment, the first engagement feature includes an annular groove formed radially into annular wall 146' having a groove end wall (not numbered) disposed away from radially-extending wall portion 144. The second engagement feature includes an annular projection extending radially-outwardly from along annular wall 154' of retainment ring 120'. Optionally, an additional flanged wall portion 162' can extend from along radial flange 152' and includes an end wall (not numbered) forming a space or gap with the portion of the flexible wall forming second open end 148, as indicated by dimension GP2. Preferably, radial flange 152' and flanged wall portion 162' project outwardly beyond annular wall 146' a distance sufficient to retain the flexible wall thereon, as indicated by dimension OL2, such as has been discussed above.

Additionally, gas spring assembly 100 and/or 100' can optionally include a jounce bumper 164 that can be supported on piston assembly 104 and/or 104' in any suitable manner. As one example of a suitable mounting arrangement, jounce bumper 164 can be supported on retainment ring 120 or 120'. As such, the securement of the retainment ring on the piston body would also result in the installation of the jounce bumper. This would be expected to desirably reduce assembly costs associated with manufacturing the gas spring assembly.

In one exemplary embodiment, jounce bumper 164 can be supported centrally within the retainment ring, such as by a plurality of support arms or walls 166 extending between the jounce bumper and the retainment ring, for example, and can be received within central recess portion 136 of piston body 118 (or 118'). Thus, the jounce bumper can engage one or more of central column 140 and plurality of webs 142 such that loads imparted to the jounce bumper during the course of normal usage of the gas spring assembly can be transferred through the piston body to lower structural component LSC. In one preferred embodiment, jounce bumper 164 and support arms 166 are integrally formed with the retainment ring. As such, additional benefits and reduced costs associated with manufacturing, inventory and assembly could also be realized. Accordingly, the jounce bumper can be formed from any suitable material or combination of materials as would be suitable for transferring the expected loads. Additionally, the jounce bumper can be of any suitable shape or configuration, and can include one or more cored areas or cavities as may be desired for manufacturing or other purposes.

It will be appreciated that piston assembly 104 and/or 104' can be formed from any material or combination of materials as may be suitable for any given application, environment and/or other conditions of use. In one exemplary embodiment, at least one component of the piston assembly can be formed from a suitable polymeric material. One such suitable polymeric material is fiber reinforced plastic, such as a glass reinforced nylon, for example. Additionally, it will be appreciated that the piston body and the retainment ring can be formed from the same or different materials, again depending upon a wide variety of factors, including the method of connection and whether the same is removable or non-removable.

A method of assembling a gas spring that includes a piston assembly in accordance with the subject matter of the present disclosure includes providing a first end member and a flexible wall having opposing first and second ends. The method also includes providing a piston assembly including a piston body, such as piston body 118 (or 118'), for example, and a retainment ring, such as retainment ring 120 (or 120'), for example. The method further includes installing a first end of the flexible wall on or along the piston assembly such that a substantially fluid-tight seal is formed therewith. It will be appreciated that such an action can be performed in any suitable manner and using any suitable arrangement or structure, such as by receiving an open end of the flexible wall along an axially-extending annular wall (e.g., annular wall 146 or 146') of the piston assembly, for example.

The method also includes positioning the retainment ring on the piston body and securing the retainment ring thereon in a suitable manner (e.g., using a flowed-material joint, an adhesive compound and/or a snap-together construction) to thereby retain the second end of the flexible wall on the piston body. It will be appreciated that the action of securing the retainment ring can utilized either removable or non-removable securement steps and/or techniques, without limitation. Thus, the method can include the retainment ring being non-removably secured on said piston body using a welded joint. The method further includes securing the first end of said flexible wall on said first end member in a suitable manner. Optionally, the method can include providing a jounce bumper (e.g., jounce bumper 164) integrally formed together with the retainment ring and securing the jounce bumper on the piston body together with the retainment ring.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly for securement between spaced first and second associated structural components of an associated vehicle, said gas spring assembly comprising: a first end member adapted for securement along the first associated structural component of the associated vehicle; a piston assembly spaced from said first end member with a longitudinally-extending central axis disposed therebetween; and, a flexible wall disposed about said axis and secured between said first end member and said piston assembly, said flexible wall including a first open end and an opposing second open end; said piston assembly including a piston body and a retainment ring, said piston body including a first end disposed toward said first end member and a second end disposed away from said first end member with an outer side wall extending at least partially therebetween; said second end including a base wall adapted for securement along the second associated structural component; said first end including a first lateral wall portion extending approximately transverse to said axis and an annular wall portion extending axially from said first lateral wall portion generally away from said second end; said second open end of said flexible wall having a cross-sectional wall thickness, said second open end received on said annular wall portion such that a substantially fluid-tight seal is formed between said second open end and said annular wall portion; and, said retainment ring including an axially extending annular side wall and a flange wall extending radially-outwardly from said side wall, said retainment ring received on said first end of said piston body such that a distance between said flange wall and said first lateral wall portion is greater than said cross-sectional wall thickness and a gap is thereby formed between said flexible wall and at least one of said flange wall and said first lateral wall portion, wherein said annular wall portion of said first end includes at least one projection extending radially outwardly and including a projection end wall disposed toward and extending in approximate alignment with said first lateral wall portion.

2. A gas spring assembly according to claim 1, wherein said retainment ring includes a plurality of inwardly-extending support arms and a jounce bumper supported by said plurality of support arms.

3. A gas spring assembly according to claim 1, wherein said gap has a dimension of at least 0.5 mm.

4. A gas spring assembly according to claim 1, wherein at least one of said piston body and said retainment ring is formed from a polymeric material.

5. A gas spring assembly according to claim 4, wherein said retainment ring is non-removably secured to said piston body.

6. A gas spring assembly according to claim 5, wherein said retainment ring and piston body are non-removably secured to one another by a polymeric weld joint.

7. A gas spring assembly according to claim 4, wherein said piston body and retainment ring are removably secured to one another.

8. A gas spring assembly according to claim 7, wherein said piston body includes a first engagement feature and said retainment ring includes a corresponding second engagement feature with one of said first and second engagement features being adapted to releaseably engage the other of said first and second engagement features.

9. A gas spring assembly according to claim 8, wherein said first engagement feature includes a radially-extending groove formed into said piston body and said second engagement feature includes a radially-extending projection formed along said retainment ring.

10. A gas spring assembly according to claim 1, wherein each of said piston body and said retainment ring is formed from a polymeric material.

11. A gas spring assembly according to claim 10, wherein said piston body and said retainment ring are formed from a common polymeric material.

12. A gas spring assembly according to claim 10, wherein said polymeric material of at least one of said piston body and said retainment ring is a fiber-reinforced plastic.

13. A method of assembling a gas spring assembly according to claim 1, wherein said second open end of said flexible wall is installed on said annular wall portion, then said retainment ring is secured on said piston body, and then said first open end of said flexible wall is secured on said first end member.

14. A gas spring assembly according to claim 13, wherein said retainment ring is non-removably secured on said piston body using a welded joint.

15. A method according to claim 1, wherein said retainment ring includes a jounce bumper integrally formed therewith.

* * * * *

UNITED STATES PATENT AND TRADEMARK OFFICE
CERTIFICATE OF CORRECTION

PATENT NO.        : 8,141,854 B2
APPLICATION NO.   : 12/055849
DATED             : March 27, 2012
INVENTOR(S)       : Levy et al.

It is certified that error appears in the above-identified patent and that said Letters Patent is hereby corrected as shown below:

In column 8, line 60, delete "claim 1" and insert -- claim 13 --.

Signed and Sealed this
Twenty-sixth Day of June, 2012

David J. Kappos
*Director of the United States Patent and Trademark Office*